(12) United States Patent
Aso et al.

(10) Patent No.: US 10,030,567 B2
(45) Date of Patent: Jul. 24, 2018

(54) EXHAUST PURIFICATION DEVICE (71) Applicant: ISUZU MOTORS LIMITED, Tokyo (JP)

(72) Inventors: Mitsuhiro Aso, Yokohama (JP); Tadashi Uchiyama, Kamakura (JP)

(73) Assignee: ISUZU MOTORS LIMITED, Tokyo (JP)

( * ) Notice: Subject to any disclaimer, the term of this patent is extended or adjusted under 35 U.S.C. 154(b) by 230 days.

(21) Appl. No.: 14/893,609

(22) PCT Filed: May 29, 2014

(86) PCT No.: PCT/JP2014/064301
§ 371 (c)(1),
(2) Date: Nov. 24, 2015

(87) PCT Pub. No.: WO2014/196453
PCT Pub. Date: Dec. 11, 2014

(65) Prior Publication Data
US 2016/0123207 A1 May 5, 2016

(30) Foreign Application Priority Data

Jun. 3, 2013 (JP) ................................ 2013-116999

(51) Int. Cl.
*B01D 49/00* (2006.01)
*B01D 39/00* (2006.01)
(Continued)

(52) U.S. Cl.
CPC ............. *F01N 9/002* (2013.01); *F01N 3/025* (2013.01); *F01N 3/027* (2013.01); *F01N 3/0253* (2013.01);
(Continued)

(58) Field of Classification Search
None
See application file for complete search history.

(56) References Cited

U.S. PATENT DOCUMENTS 4,400,971 A * 8/1983 Tassicker ........... B01D 46/0013
340/607
5,651,248 A 7/1997 Kawamura
(Continued)

FOREIGN PATENT DOCUMENTS

JP 8-68310 3/1996
JP 2002-21537 1/2002
(Continued)

OTHER PUBLICATIONS

English translation of JP2009097410 May 2009 (Year: 2009).*
(Continued)

*Primary Examiner* — Amber Rose Orlando
(74) *Attorney, Agent, or Firm* — Staas & Halsey LLP (57) ABSTRACT

An exhaust gas purification device, including a diesel particulate filter ("DPF") for collecting particulate matter contained in an exhaust gas, a forced regeneration unit or performing forced regeneration, a capacitance detection unit for detecting a capacitance of the DPF, a total accumulated amount estimation unit for estimating a total amount of accumulated particulate matter and ash collected in the DPF on the basis of the detected capacitance, and an ash accumulated amount calculation unit for calculating an amount of accumulated ash by using, as the amount of accumulated ash, the total amount of accumulation which is estimated when the forced regeneration finishes.

15 Claims, 5 Drawing Sheets

(51) Int. Cl.
  *B01D 41/00* (2006.01)
  *B01D 45/00* (2006.01)
  *B01D 46/00* (2006.01)
  *B01D 50/00* (2006.01)
  *B01D 51/00* (2006.01)
  *F01N 9/00* (2006.01)
  *F01N 3/025* (2006.01)
  *F01N 3/027* (2006.01)
  *F01N 13/00* (2010.01)

(52) U.S. Cl.
  CPC ........... *F01N 9/005* (2013.01); *F01N 13/008* (2013.01); *F01N 2560/05* (2013.01); *F01N 2560/12* (2013.01); *F01N 2900/1606* (2013.01); *F01N 2900/1611* (2013.01); *F02D 2200/0812* (2013.01); *Y02T 10/47* (2013.01)

(56) References Cited

U.S. PATENT DOCUMENTS

| | | | |
|---|---|---|---|
| 6,928,809 B2* | 8/2005 | Inoue | F01N 3/023 55/DIG. 30 |
| 9,759,107 B2* | 9/2017 | Uchiyama | F01N 3/0253 |
| 2004/0211159 A1 | 10/2004 | Hamahata et al. | |
| 2007/0006577 A1* | 1/2007 | Yokoyama | F01N 9/002 60/297 |
| 2007/0289293 A1* | 12/2007 | Kerchner | F01N 3/023 60/295 |
| 2008/0034839 A1* | 2/2008 | Ante | G01N 1/2205 73/23.31 |
| 2008/0098724 A1 | 5/2008 | Konstandopoulos | |
| 2008/0229931 A1* | 9/2008 | Katsuyama | B01D 46/0078 96/417 |
| 2009/0309571 A1 | 12/2009 | Katsuyama et al. | |
| 2012/0266646 A1* | 10/2012 | Maeda | F02D 41/1466 73/1.06 |
| 2012/0318055 A1* | 12/2012 | Uchiyama | F01N 11/002 73/114.69 |
| 2013/0318948 A1* | 12/2013 | Van Marion | F02D 41/1466 60/277 |
| 2014/0308170 A1* | 10/2014 | Takayanagi | F01N 9/002 422/119 |

FOREIGN PATENT DOCUMENTS

| | | |
|---|---|---|
| JP | 2004-76605 | 3/2004 |
| JP | 2008-101604 | 5/2008 |
| JP | WO 2008/117853 A1 | 10/2008 |
| JP | 2009-97410 | 5/2009 |
| JP | 2009-270503 | 11/2009 |
| JP | 201314804 | * 8/2013 |

OTHER PUBLICATIONS

J-PlatPat Abstract, Publication No. 2009-097410, Published May 7, 2009.
Espacenet Abstract, Publication No. 2004-076605, Published Mar. 11, 2004.
J-PlatPat Abstract, Publication No. 2002-021537, Published Jan. 23, 2002.
J-PlatPat Abstract, Publication No. 08-068310, Published Mar. 12, 1996.
Espacenet Abstract, Publication No. 2008-101604, Published May 1, 2008.
Espacenet Abstract, Publication No. 2009-270503, Published Nov. 19, 2009.
International Search Report dated Aug. 19, 2014 for corresponding International Patent Application No. PCT/JP2014/064301.
Extended European Search Report dated Feb. 15, 2017 in corresponding European Patent Application No. 14807530.2.
PCT International Preliminary Report on Patentability dated Dec. 8, 2015 in corresponding International Patent Application No. PCT/JP2014/064301.

* cited by examiner

EXHAUST PURIFICATION DEVICE

CROSS-REFERENCE TO RELATED APPLICATIONS

This application is a U.S. National Stage Application, which claims the benefit under 35U.S.C. § 371 of PCT International Patent Application No. PCT/JP2014/064301, filed May 29, 2014, which claims the foreign priority benefit under 35 U.S.C. § 119 of Japanese Patent Application No. 2013-116999, filed June 3, 2013, the contents of which are incorporated herein by reference.

TECHNICAL FIELD

The present invention relates to a device for purifying an exhaust gas.

BACKGROUND ART

A diesel particulate filter (hereinafter referred to as "DPF"), for example, is known as a filter for collecting particulate matter (PM) contained in an exhaust gas emitted from a diesel engine.

The DPF can only collect a limited amount of PM, and therefore a so-called forced regeneration for periodically burning and removing accumulated PM needs to be carried out. The forced regeneration is carried out by supplying unburned fuel (HC) to an oxidation catalyst on an upstream exhaust pipe through in-pipe injection or post-injection, and raising the temperature of the exhaust gas to a PM-burning temperature with the heat produced upon oxidation.

The PM that accumulates in the DPF contains a soot component and so on emitted primarily from an engine. An engine oil component and so on also accumulates in the DPF. Among these components, the soot component is burned and removed by the forced regeneration, but the engine oil results in residual ash. The ash component is incombustible and cannot be removed even if the forced regeneration is carried out. As the ash component further accumulates, the DPF becomes clogged with the ash component. This brings about an increased pressure loss. To deal with this, maintenance for periodically cleaning the accumulated ash becomes necessary.

There is known a technique in which the timing for maintaining a DPF is predicted by estimating the amount of accumulated ash from a pressure difference across the DPF. The pressure difference across the DPF is detected immediately after the forced regeneration of the DPF finishes (e.g., see PATENT LITERATURE 1).

LISTING OF REFERENCES

Patent Literature 1: Japanese Patent Application Laid-Open Publication (Kokai) No. 2009-270503

As accumulated PM is burned through the forced regeneration, a correlation between the amount of accumulated PM and the pressure difference across the DPF drops due to a decrease in the pressure difference across the DPF, especially toward the end of the forced regeneration. Thus, the estimation technique that relies upon the pressure difference across the DPF does not allow the end of the forced regeneration (complete regeneration) to be grasped accurately, and there remains an issue that an influence of an ash component in the pressure difference across the DPF cannot be set apart.

Figure 5:
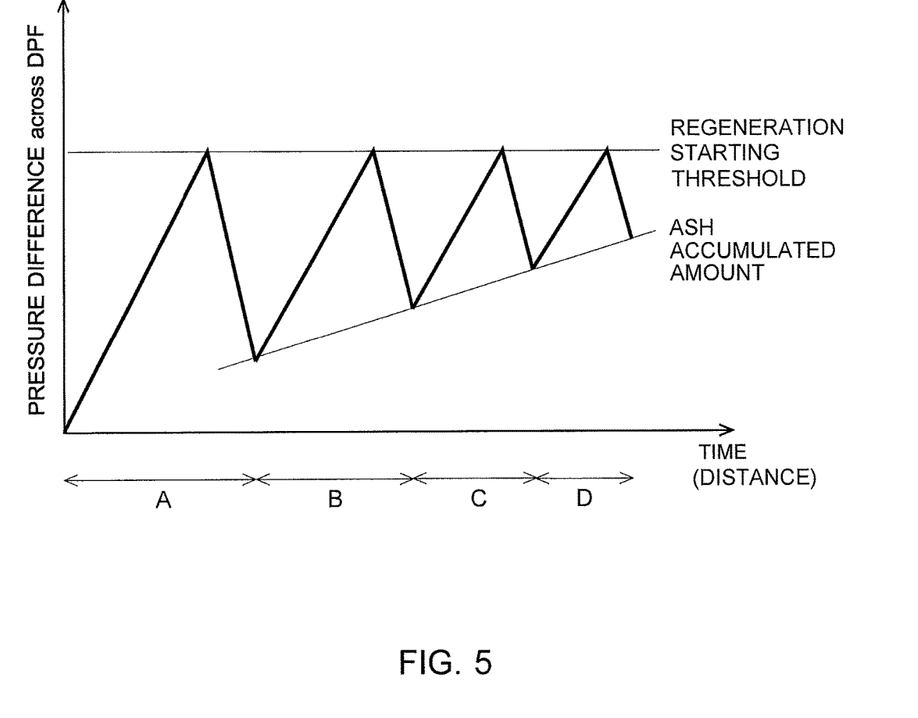
FIG. 5 is a timing chart illustrating regeneration intervals of a conventional exhaust gas purification device.

Furthermore, as illustrated in FIG. 5 of the accompanying drawings, the amount of accumulated ash increases each time the forced regeneration is carried out, and the pressure difference across the DPF also increases with the increasing amount of accumulated ash. Thus, the weight of the amount of accumulated PM relative to a regeneration starting threshold decreases. Consequently, regeneration intervals A-D become too short, and the frequency of forced regenerations increases. This deteriorates the fuel economy and accelerates the DPF deterioration.

SUMMERY OF INVENTION

An object of the present invention is to provide an exhaust gas purification device that is capable of effectively detecting an amount of accumulated ash collected by a DPF.

To achieve the above-mentioned object, an exhaust gas purification device according to the present invention includes a filter provided in an exhaust passage of an internal combustion engine and configured to collect particulate matter contained in an exhaust gas; a filter regeneration unit configured to execute a forced regeneration to burn and remove the particulate matter that has accumulated in the filter; a capacitance (electrostatic capacity) detecting unit configured to detect a capacitance (electrostatic capacity) of the filter; a total accumulated amount estimating unit configured to estimate a total accumulated amount of the particulate matter and an ash component collected by the filter on the basis of the capacitance detected by the capacitance detecting unit; and an ash accumulated amount calculating unit configured to calculate an ash accumulated amount by using, as the ash accumulated amount, the total accumulated amount that is estimated by the total accumulated amount estimating unit when the forced regeneration by the filter regeneration unit finishes.

The exhaust gas purification device may further include a PM accumulated amount calculating unit that calculates an amount of accumulated particulate matter, which is collected by the filter. The PM accumulated amount calculating unit calculates an amount of accumulated particle matter by subtracting the ash accumulated amount, which is calculated by the ash accumulated amount calculating unit, from the total accumulated amount, which is estimated by the total accumulated amount estimating unit.

The filter regeneration unit may execute the forced regeneration when the amount of accumulated particulate matter, which is calculated by the PM accumulated amount calculating unit, reaches an upper threshold up to which the filter can collect the particulate matter.

The exhaust gas purification device may further include a cleaning request determining unit to determine that maintenance for cleaning ash accumulated in the filter needs to be carried out when the ash accumulated amount, which is calculated by the ash accumulated amount calculating unit, reaches an upper threshold which affects a permitted exhaust pressure of the internal combustion engine.

The capacitance detecting unit may include at least one pair of electrodes that forms a capacitor, and the paired of electrodes is disposed so as to oppose each other with at least one partition wall interposed therebetween in the filter.

The exhaust gas purification device may further include a bypass passage that connects to the exhaust passage at a position upstream of the filter and connects to the exhaust passage at a position downstream of the filter so as to bypass the filter, and a second filter that is provided in the bypass passage and that collects particulate matter contained in the exhaust gas flowing through the bypass passage. The paired electrodes may be disposed so as to oppose each other with at least one partition wall interposed therebetween in the second filter.

When the forced regeneration of the second filter is to be executed, the paired electrodes may function as a heater.

According to an exhaust gas purification device of the present invention, the amount of accumulated ash, which is collected by the DPF, can be effectively detected.

DETAILED DESCRIPTION

Hereinafter, an exhaust gas purification device according to embodiments of the present invention will be described with reference to the accompanying drawings. Identical parts are given identical reference numerals and signs, and their names and functions are identical as well. Thus, detailed description of such parts will not be repeated.

Figure 1:
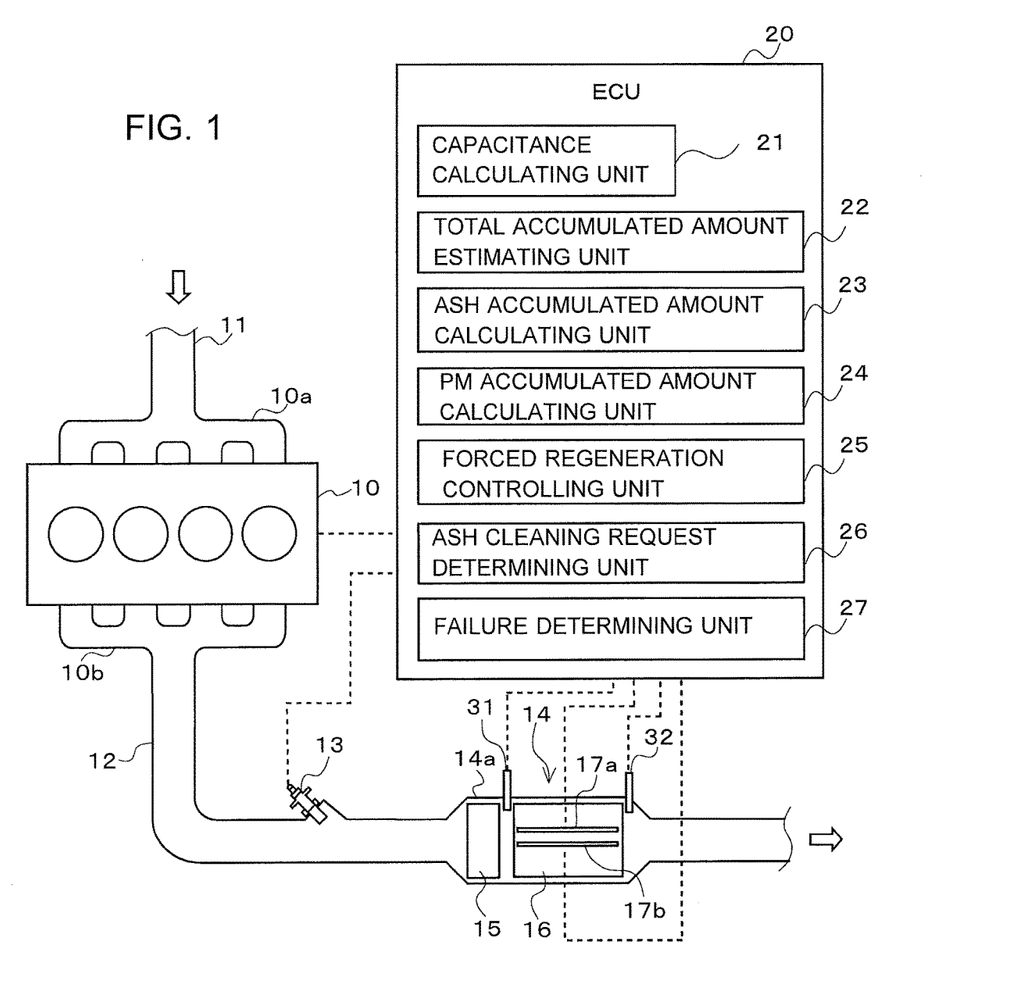
FIG. 1 is an overall configuration diagram schematically illustrating an exhaust gas purification device according to an embodiment of the present invention.

As illustrated in FIG. 1, a diesel engine (hereinafter, simply referred to as "engine") 10 has an intake manifold 10a and an exhaust manifold 10b. An intake passage 11 for introducing fresh air is connected to the intake manifold 10a, and an exhaust passage 12 for discharging an exhaust gas to the atmosphere is connected to the exhaust manifold 10b. An in-pipe injection device 13, an exhaust aftertreatment device 14, a DPF inlet temperature sensor 31, and a DPF outlet temperature sensor 32 are provided in the exhaust passage 12, in order from the upstream side of the exhaust passage.

The in-pipe injection device 13 injects unburned fuel (HC) into the exhaust passage 12 in response to an instruction signal issued from an ECU 20. The in-pipe injection device 13 may be omitted if post-injection through multiple-injection of the engine 10 is employed.

The exhaust aftertreatment device 14 is constituted by an oxidation catalyst 15 and a DPF 16 disposed inside a casing 14a. The oxidation catalyst 15 is disposed upstream of the DPF 16 in the exhaust passage.

The oxidation catalyst 15 includes, for example, a ceramic carrier having a cordierite honeycomb structure, and a catalyst component supported on a surface of the ceramic carrier. As the unburned fuel (HC) is supplied from the in-pipe injection device 13 or through post-injection, the oxidation catalyst 15 oxidizes the unburned fuel, thereby causing the exhaust gas temperature to rise.

The DPF 16 is formed, for example, by a number of cells defined by porous ceramic partition walls disposed along a flowing direction of the exhaust gas, and the upstream side and the downstream side of these cells are alternately plugged. The DPF 16 collects PM, which is contained in the exhaust gas, in small cavities and on the surfaces of the partition walls. A primary component of the PM is a soot component which is contained in the exhaust gas. When an amount of accumulated PM reaches a predetermined amount, a so-called forced regeneration for burning and removing the PM is carried out. The forced regeneration is carried out by supplying the unburned fuel (HC) to the oxidation catalyst 15 from the in-pipe injection device 13 or through post-injection, and then raising the temperature of the DPF 16 to the PM-burning temperature (e.g., approximately 600 degrees C.).

The DPF 16 of this embodiment has a pair of electrodes 17a and 17b, which forms a capacitor, disposed so as to oppose each other with at least one or more partition walls interposed therebetween. The electrodes 17a and 17b are each electrically connected to an electronic control unit (hereinafter referred to as "ECU") 20.

The DPF inlet temperature sensor 31 detects the temperature of the exhaust gas flowing into the DPF 16 (hereinafter referred to as "inlet temperature $T_{IN}$"). The DPF outlet temperature sensor 32 detects the temperature of the exhaust gas flowing out of the DPF 16 (hereinafter referred to as "outlet temperature $T_{OUT}$"). The inlet temperature $T_{IN}$ and the outlet temperature $T_{OUT}$ are entered to the ECU 20 that is electrically connected to the DPF inlet temperature sensor 31 and the DPF outlet temperature sensor 32.

The ECU 20 controls fuel injection and so on of the engine 10 and the in-pipe injection device 13, and includes a known CPU, ROM, RAM, input port, output port, and other components. The ECU 20 further includes, as part of its function elements, a capacitance calculating unit 21, a total accumulated amount estimating unit 22, an ash accumulated amount calculating unit 23, a PM accumulated amount calculating unit 24, a forced regeneration controlling unit 25, an ash cleaning request determining unit 26, and a failure determining unit 27. The description continues with a premise that these functional elements are included in the ECU 20, which is an integrated piece of hardware, but some of these functional elements can be provided in a separate piece of hardware.

In this embodiment, the capacitance calculating unit 21 and the paired electrodes 17a and 17b constitute a capacitance calculating unit of the present invention, and the forced regeneration controlling unit 25 and the in-pipe injection device 13 (or a fuel injection device (not illustrated) of the engine 10) constitute a filter regeneration unit of the present invention.

The capacitance calculating unit 21 calculates a capacitance (electrostatic capacity) C between the two electrodes 17a and 17b through the following expression 1, where ε represents a dielectric constant of a medium between the electrodes 17a and 17b, and d represents the distance between the electrodes 17a and 17b.

$$c = \varepsilon \times \frac{S}{d} \qquad \text{[Expression 1]}$$

The total accumulated amount estimating unit 22 estimates a total accumulated amount $SUM_{DEP}$ consisting of an amount of accumulated PM, i.e., $PM_{DEP}$, and an amount of accumulated ash, i.e., $ASH_{DEP}$, on the basis of the capacitance C calculated by the capacitance calculating unit 21($SUM_{DEP}=PM_{DEP}+ASH_{DEP}$). When PM and ash having a dielectric constant ε accumulate between the electrodes 17a and 17b, the distance d between the electrodes 17a and 17b substantially decreases, and the capacitance C increases in turn. When PM and ash further accumulate between the electrodes 17a and 17b, the capacitance C further increases along with an increase in the dielectric constant ε. In other words, the capacitance C and the total accumulated amount $SUM_{DEP}$ have proportional relation.

The ECU 20 has a memory that stores a map (not shown) indicating relation between the capacitance and the total accumulated amount. The map is prepared in advance through an experiment or the like. The total accumulated amount estimating unit 22 reads, from the stored map, a value corresponding to the capacitance C calculated by the capacitance calculating unit 21 and estimates the total accumulated amount $SUM_{DEP}$ of PM and ash collected by the DPF 16. The capacitance C varies with the temperature, and thus the estimated total accumulated amount $SUM_{DEP}$ may be corrected on the basis of an average temperature of the inlet temperature $T_{IN}$ and the outlet temperature $T_{OUT}$ (temperature inside the DPF).

The ash accumulated amount calculating unit 23 calculates the amount $ASH_{DEP}$ of accumulated ash by setting it apart from the total accumulated amount $SUM_{DEP}$ estimated by the total accumulated amount estimating unit 22. When the accumulated PM has completely been burned and removed (hereinafter, referred to as "complete regeneration") through the forced regeneration of the DPF 16, an incombustible ash component remains in the DPF 16. When such a condition arises, the amount of the accumulated ash component ceases to change, and thus the changing rate $\Delta C/\Delta T$ of the capacitance C calculated by the capacitance estimating unit 21 decreases. In other words, the total accumulated amount $SUM_{DEP}$ estimated by the total accumulated amount estimating unit 22 upon the complete regeneration can represent the remaining amount $ASH_{DEP}$ of the accumulated ash. As the changing rate $\Delta C/\Delta T$ of the capacitance C reaches a predetermined lower threshold indicative of the complete regeneration, the ash accumulated amount calculating unit 23 takes the total accumulated amount $SUM_{DEP}$, which is estimated by the total accumulated amount estimating unit 22 upon the complete regeneration, as the amount $ASH_{DEP}$ of accumulated ash ($SUM_{DEP}=ASH_{DEP}$).

The PM accumulated amount calculating unit 24 calculates the amount $PM_{DEP}$ of accumulated PM from the total accumulated amount $SUM_{DEP}$ estimated by the total accumulated amount estimating unit 22, after the forced regeneration finishes. When PM has been burned and removed from the DPF 16 through the complete regeneration and only an ash component remains in the DPF 16, PM starts accumulating in the DPF 16 again. In other words, if the amount $ASH_{DEP}$ of accumulated ash, which is calculated upon the complete regeneration, is used an offset amount (initial value), it becomes possible to estimate the amount $PM_{DEP}$ of accumulated PM from the total accumulated amount $SUM_{DEP}$ that can increase thereafter.

The PM accumulated amount calculating unit 24 stores the amount $ASH_{DEP}$ of accumulated ash calculated by the ash accumulated amount calculating unit 23 upon the complete regeneration as an offset amount, and then successively calculates the amount $PM_{DEP}$ of accumulated PM by subtracting the amount $ASH_{DEP}$ of accumulated ash, serving as the offset amount, from the total accumulated amount $SUM_{DEP}$ estimated by the total accumulated amount estimating unit 22 ($PM_{DEP}=SUM_{DEP}-ASH_{DEP}$).

The forced regeneration controlling unit 25 controls the forced regeneration of the DPF 16 on the basis of the amount $PM_{DEP}$ of accumulated PM calculated by the PM accumulated amount calculating unit 24. The memory of the ECU 20 stores a predefined PM accumulation upper limit amount $PM_{MAX}$ up to which the DPF 16 can collect PM. When the amount $PM_{DEP}$ of accumulated PM calculated by the PM accumulated amount calculating unit 24 reaches the PM accumulation upper limit amount $PM_{MAX}$ ($PM_{DEP} \geq PM_{MAX}$), the forced regeneration controlling unit 25 executes the forced regeneration by injecting fuel from the in-pipe injection device 13 (or through post-injection).

The ash cleaning request determining unit 26 determines whether maintenance on the DPF 16 to periodically clean the ash needs to be carried out, on the basis of the amount $ASH_{DEP}$ of accumulated ash calculated by the ash accumulated amount calculating unit 23. The memory of the ECU 20 stores a predefined cleaning request threshold $ASH_{MAX}$. The cleaning request threshold $ASH_{MAX}$ is set, for example, in accordance with a range in which the pressure loss across the DPF 16 due to the ash accumulation does not affect the permitted exhaust pressure of the engine 10.

The ash cleaning request determining unit 26 determines that the maintenance needs to be carried out when the amount $ASH_{DEP}$ of accumulated ash calculated by the ash accumulated amount calculating unit 23 reaches the cleaning request threshold $ASH_{MAX}$ ($ASH_{DEP} \geq ASH_{MAX}$). The result of this determination is stored in the memory of the ECU 20 and is introduced to an external device (e.g., a service tool) when the external device is connected to the ECU. A warning light or the like may be employed to inform a driver of the service necessity.

The failure determining unit 27 determines whether a failure of the engine 10 and so on has occurred on the basis of the amount $ASH_{DEP}$ of accumulated ash, which is calculated by the ash accumulated amount calculating unit 23, and the execution frequency of forced regenerations (how many times the forced regeneration is carried out). It is generally known that a correlation is present between the amount of accumulated ash and an amount of engine oil consumption. The failure determining unit 27 calculates an increasing rate (slope) of the amount $ASH_{DEP}$ of accumulated ash on the basis of the execution frequency of forced regenerations and the amount $ASH_{DEP}$ of accumulated ash calculated upon each instance of the forced regeneration, and determines that a failure of the engine 10 and so on have occurred if the increasing rate exceeds a threshold indicative of an abnormal condition.

Figure 2:
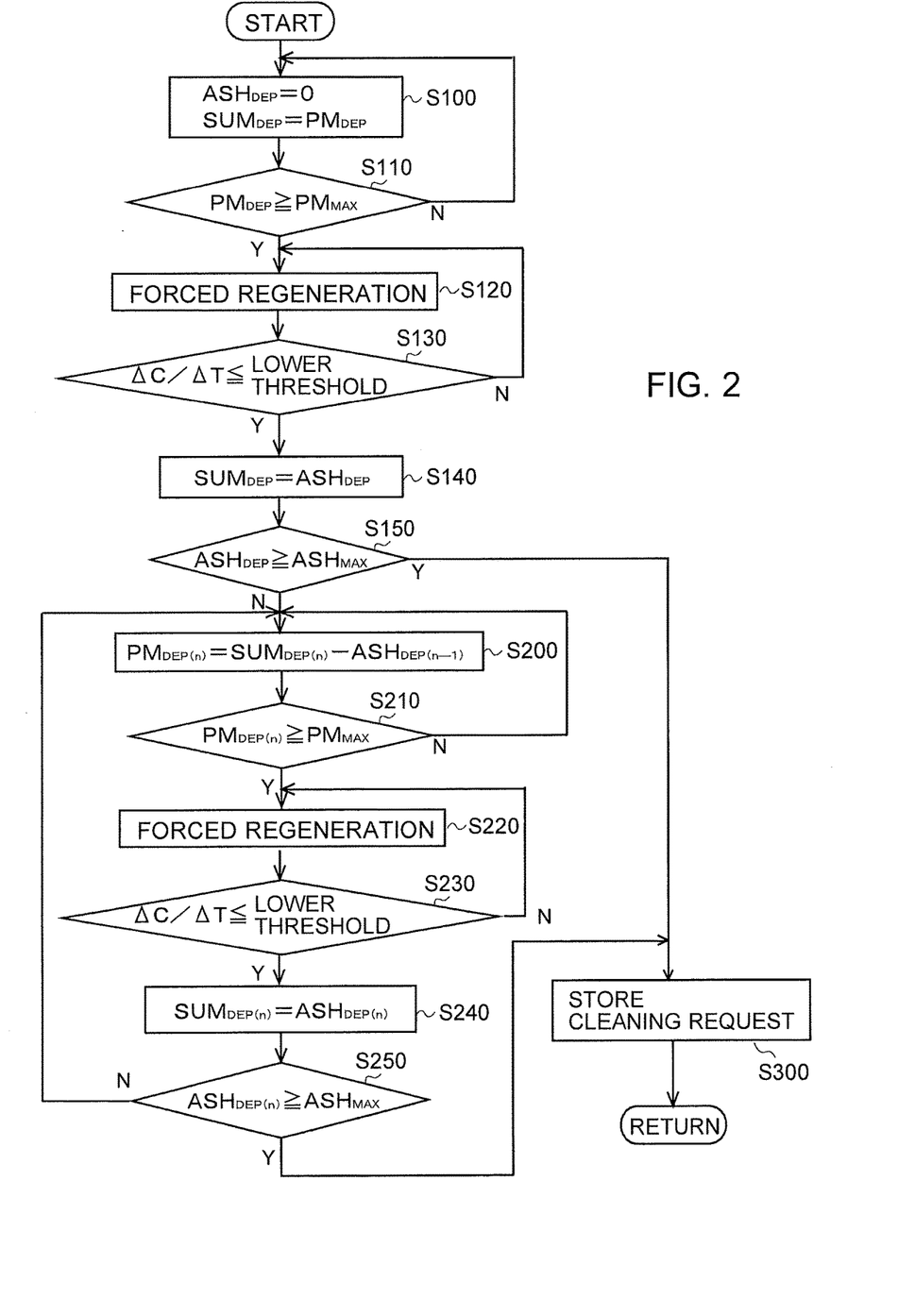
FIG. 2 is a flowchart illustrating the content of control executed by the exhaust gas purification device according to the embodiment of the present invention.

Referring now to FIG. 2, a control process of the exhaust gas purification device according to this embodiment will be described. This control starts in a state in which no ash has accumulated in the DPF 16 (e.g., when a new DPF is used, or after the maintenance has completed).

In Step S100, the amount $ASH_{DEP}$ of accumulated ash, serving as the offset amount, is set to zero, and the estimated total accumulated amount $SUM_{DEP}$ is used as the amount $PM_{DEP}$ of accumulated PM ($ASH_{DEP}=0$, $SUM_{DEP}=PM_{DEP}$).

In Step S110, it is determined whether the amount $PM_{DEP}$ of accumulated PM has reached the PM upper threshold $PM_{MAX}$. If it is determined that the amount $PM_{DEP}$ of accumulated PM has reached the PM upper threshold $PM_{MAX}$ ($PM_{DEP} \geq PM_{MAX}$), the control proceeds to Step S120, and a first instance of the forced regeneration is commenced.

In Step S130, a determination on a complete regeneration is made on the basis of the changing rate $\Delta C/\Delta T$ of the capacitance C. If the changing rate $\Delta C/\Delta T$ has reached a lower threshold indicative of the complete regeneration ($\Delta C/\Delta T \leq$ lower threshold), the control proceeds to Step S140. In Step S140, the total accumulated amount $SUM_{DEP}$ upon the complete regeneration is taken as the amount $ASH_{DEP}$ of accumulated ash ($SUM_{DEP}=ASH_{DEP}$).

In Step S150, it is determined whether the amount $ASH_{DEP}$ of accumulated ash has reached the cleaning request threshold $ASH_{MAX}$. If the amount $ASH_{DEP}$ of accumulated ash has reached the cleaning request threshold $ASH_{MAX}$ ($ASH_{DEP} \geq ASH_{MAX}$), a request for cleaning the ash (maintenance on the DPF 16 is necessary) is stored in the memory of the ECU 20 in Step S300. Then, the control proceeds to "Return."

In Step S200, the amount $ASH_{DEP(n)}$ of accumulated ash calculated in an immediately preceding instance is used as the offset amount, and calculation of the amount $PM_{DEP(n)}$ of accumulated PM starts. This amount $PM_{DEP(n)}$ of accumulated PM is calculated by subtracting the amount $ASH_{DEP(n)}$ of accumulated ash from the total accumulated amount $SUM_{DEP(n)}$ ($PM_{DEP(n)}=SUM_{DEP(n)}-ASH_{DEP(n-1)}$).

In Step S210, it is determined whether the amount $PM_{DEP(n)}$ of accumulated PM has reached the PM upper threshold $PM_{MAX}$. If it is determined that the amount $PM_{DEP(n)}$ of accumulated PM has reached the PM upper threshold $PM_{MAX}$ ($PM_{DEP(n)} \geq PM_{MAX}$), the control proceeds to Step S220, and a second or subsequent instance of the forced regeneration is commenced.

In Step S230, a determination on the complete regeneration is made on the basis of the changing rate $\Delta C/\Delta T$ of the capacitance C. If the changing rate $\Delta C/\Delta T$ has reached a lower threshold indicative of the complete regeneration ($\Delta C/\Delta T \leq$ lower threshold), the control proceeds to Step S240. In Step S240, the total accumulated amount $SUM_{DEP(n)}$ upon the complete regeneration is used as the amount $ASH_{DEP(n)}$ of accumulated ash ($SUM_{DEP(n)}=ASH_{DEP(n)}$).

In Step S250, it is determined whether the amount $ASH_{DEP(n)}$ of accumulated ash has reached the cleaning request threshold $ASH_{MAX}$. If the amount $ASH_{DEP(n)}$ of accumulated ash has reached the cleaning request threshold $ASH_{MAX}$ ($ASH_{DEP(n)} \geq ASH_{MAX}$), the control proceeds to Step S300 to store a request for cleaning the ash, and the control then proceeds to "Return." On the other hand, if the amount $ASH_{DEP(n)}$ of accumulated ash has not reached the cleaning request threshold $ASH_{MAX}$ ($ASH_{DEP(n)} < ASH_{MAX}$), the control is returned to Step S200. In other words, Steps S200 to S250 are iteratively executed until the amount $ASH_{DEP}$ of accumulated ash reaches the cleaning request threshold $ASH_{MAX}$.

Although omitted in the description of the process illustrated in FIG. 2, an increasing rate of the amount $ASH_{DEP(n)}$ of accumulated ash in a current instance relative to the amount $ASH_{DEP(n-1)}$ of accumulated ash in a previous instance may be calculated during any of Steps S240 and S250, and a determination on a failure of the engine 10 and so on may be made if the increasing rate exceeds a threshold indicative of an abnormal condition.

Effects of the exhaust gas purification device according to this embodiment will now be described.

In the existing technique, the amount of accumulated ash collected by a DPF is estimated from the pressure difference across the DPF detected upon a complete regeneration of the DPF. However, the correlation between the amount of accumulated PM and the pressure difference across the DPF drops due to a decrease in the pressure difference across the DPF toward the end of a forced regeneration. Thus, the complete regeneration cannot be detected with accuracy, and an influence of an ash component included in the pressure difference across the DPF may not be set apart with accuracy.

Figure 3:
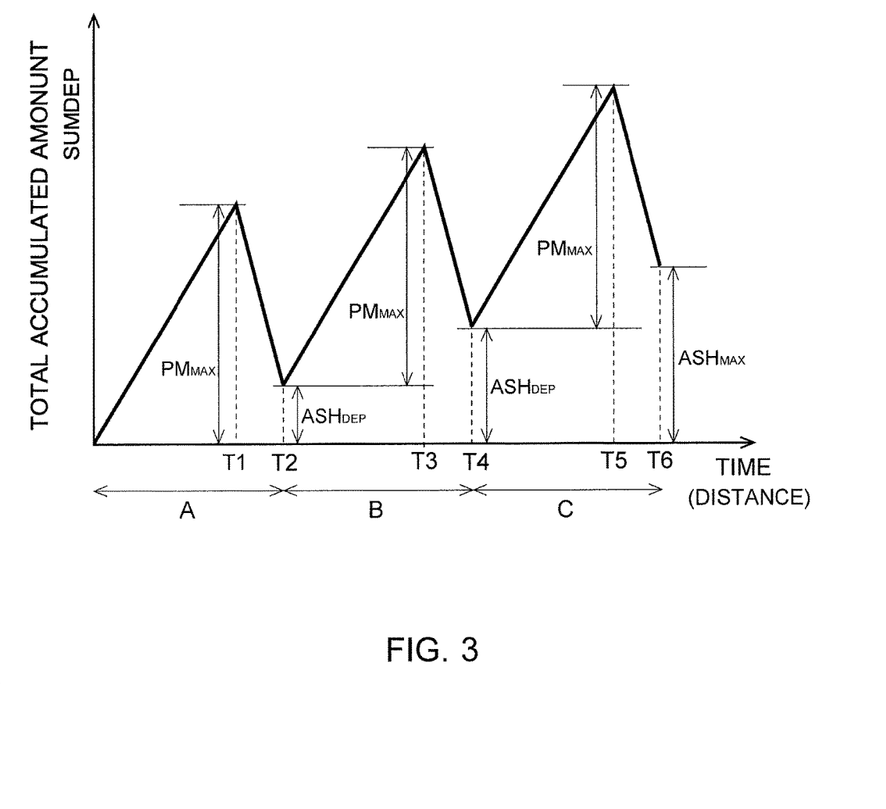
FIG. 3 is a timing chart illustrating regeneration intervals of the exhaust gas purification device according to the embodiment of the present invention.

On the contrary, the exhaust gas purification device according to this embodiment determines the timing of the complete regeneration on the basis of the capacitance C, which has good sensitivity even toward the end of a forced regeneration, and sets apart and calculates the amount $ASH_{DEP}$ of accumulated ash on the basis of the capacitance C detected upon the complete regeneration (see T2, T4, and T6 in FIG. 3). Furthermore, when the calculated amount $ASH_{DEP}$ of accumulated ash has reached the cleaning request threshold $ASH_{MAX}$ (see T6 in FIG. 3), it is determined that the maintenance on the DPF 16 is necessary. Accordingly, the exhaust gas purification device of this embodiment can accurately detect the amount of accumulated ash collected by the DPF 16, and accurately determine the timing for maintaining the DPF 16 to periodically clean the ash.

In the exhaust gas purification device according to this embodiment, the amount $ASH_{DEP}$ of accumulated ash calculated upon the complete regeneration is used as an offset amount, and the amount $PM_{DEP}$ of accumulated PM is calculated by subtracting the amount $ASH_{DEP}$ of accumulated ash from the total accumulated amount $SUP_{DEP}$ that increases thereafter. The forced regeneration is carried out when the amount $PM_{DEP}$ of accumulated PM, which is obtained with the amount $ASH_{DEP}$ of accumulated ash, serving as an initial value, being taken into consideration, reaches the PM upper threshold $PM_{MAX}$ (see T1, T3, and T5 in FIG. 3). Accordingly, the exhaust gas purification device of this embodiment can secure long regeneration intervals even when the ash further accumulates (see A-C in FIG. 3), and a deterioration of the fuel economy, a deterioration of the catalyst, and so on can be effectively prevented.

It should be noted that the present invention is not limited to the above-described embodiment, and can be implemented with changes and modifications, as appropriate, within the scope that does not depart from the spirit of the present invention.

Figure 4:
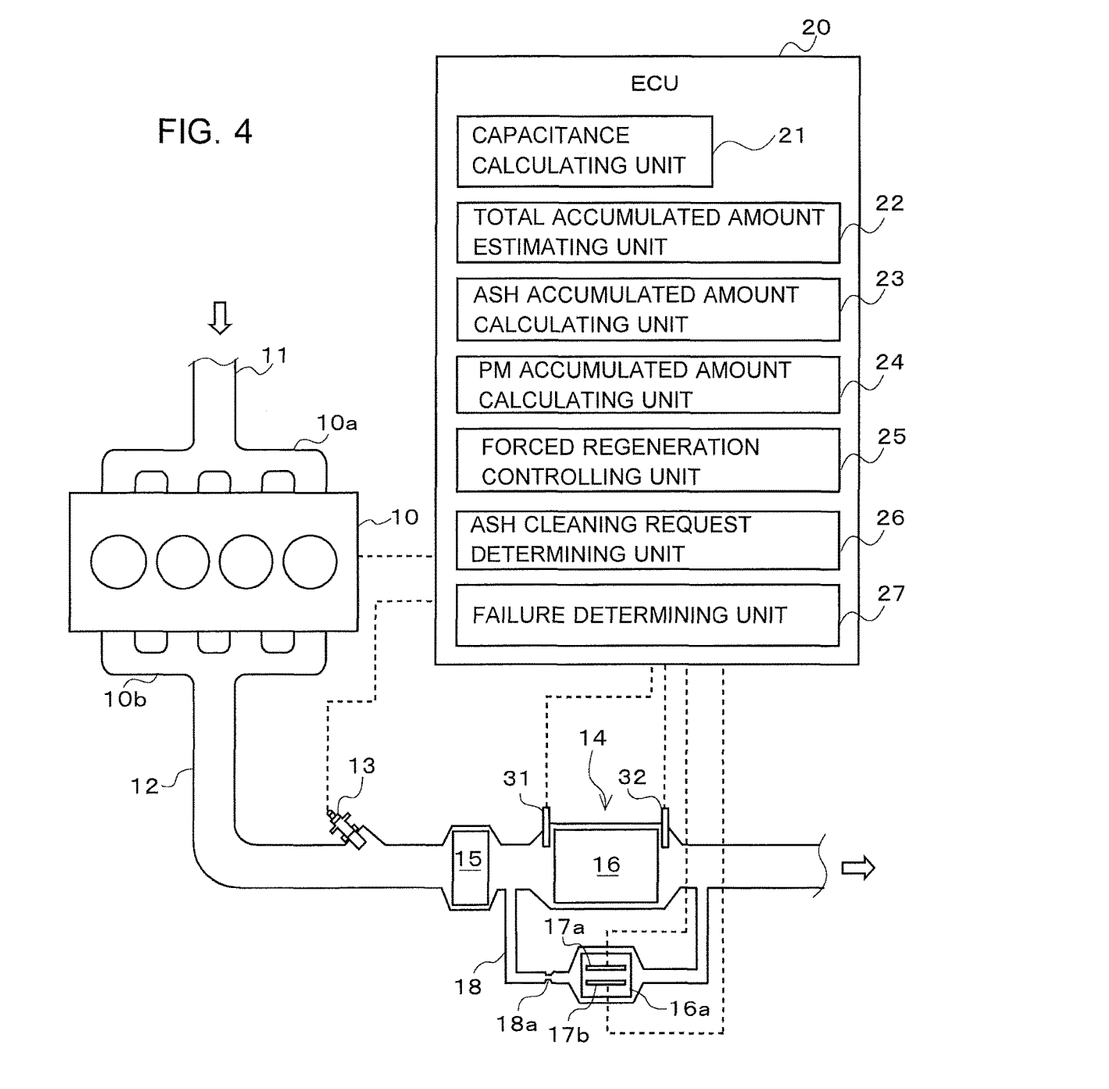
FIG. 4 is an overall configuration diagram schematically illustrating an exhaust gas purification device according to another embodiment of the present invention.

For example, as illustrated in FIG. 4, a bypass passage 18 may be connected to the exhaust passage 12 so as to bypass the DPF 16, and a measurement DPF 16a (second filter) with a small capacity may be provided in the bypass passage 18. In this case, it is preferred that a pair of electrodes 17a and 17b be disposed so as to oppose each other with at least one partition wall interposed therebetween in the measurement DPF 16a and that the bypass passage 18 be equipped with an orifice 18a (throttle) that regulates the flow rate of the exhaust gas. When a forced regeneration of the measurement DPF 16a is to be executed, a voltage may be applied across the paired electrodes 17a and 17b so as to cause the paired electrodes 17a and 17b to function as a heater. The number of the electrodes 17a and 17b is not limited to two, and a plurality of pairs of electrodes may be provided. The present invention is not limited to an internal combustion engine, such as an engine, and can also be applied, for example, to a device for purifying PM contained in a flue gas emitted from a plant or the like.

What is claimed is:

1. An exhaust gas purification device comprising:
a filter provided in an exhaust passage of an internal combustion engine and configured to collect particulate matter contained in an exhaust gas;
an inlet temperature sensor that detects inlet temperature of the filter;
an outlet temperature sensor that detects outlet temperature of the filter; and
an electronic controller configured to
to execute a forced regeneration to burn and remove the particulate matter that has accumulated in the filter, detect a capacitance of the filter;

estimate a total accumulated amount of the particulate matter and an ash component, which are collected by the filter, based on the detected capacitance, calculate an ash accumulated amount by using, as the ash accumulated amount, the estimated total accumulated amount, when the forced regeneration finishes, and correct the total accumulated amount of the particulate matter and the ash component based on an average of the detected inlet temperature and the detected outlet temperature.

2. The exhaust gas purification device according to claim 1, wherein the electronic controller is further configured to calculate an amount of accumulated particulate matter collected by the filter by subtracting the calculated ash accumulated amount from the estimated total accumulated amount.

3. The exhaust gas purification device according to claim 2, wherein the electronic controller executes the forced regeneration when the calculated amount of accumulated particulate matter reaches an upper threshold up to which the filter can collect the particulate matter.

4. The exhaust gas purification device according to claim 1, wherein the electronic controller is further configured to determine that maintenance for cleaning ash accumulated in the filter needs to be carried out when the calculated ash accumulated amount reaches an upper threshold at which a permitted exhaust pressure of the internal combustion engine is affected.

5. The exhaust gas purification device according to claim 1, wherein the capacitance of the filter is detected by at least one pair of electrodes that forms a capacitor, the at least one pair of electrodes being disposed so as to oppose each other with at least one partition wall interposed therebetween in the filter.

6. The exhaust gas purification device according to claim 5 further comprising:

a bypass passage configured to connect to the exhaust passage at a position upstream of the filter and connect to the exhaust passage a position downstream of the filter so as to bypass the filter; and a second filter provided in the bypass passage and configured to collect particulate matter contained in an exhaust gas flowing through the bypass passage, wherein the pair of electrodes is disposed so as to oppose each other with at least one partition wall interposed therebetween in the second filter.

7. The exhaust gas purification device according to claim 6, wherein when a forced regeneration of the second filter is executed, the pair of electrodes functions as a heater.

8. The exhaust gas purification device according to claim 2, wherein the electronic controller is further configured to determine that maintenance for cleaning ash accumulated in the filter needs to be carried out when the calculated ash accumulated amount reaches an upper threshold at which a permitted exhaust pressure of the internal combustion engine is affected.

9. The exhaust gas purification device according to claim 3, wherein the electronic controller is further configured to determine that maintenance for cleaning ash accumulated in the filter needs to be carried out when the calculated ash accumulated amount reaches an upper threshold at which a permitted exhaust pressure of the internal combustion engine is affected.

10. The exhaust gas purification device according to claim 2, wherein the capacitance of the filter is detected by at least one pair of electrodes that forms a capacitor, the at least one pair of electrodes being disposed so as to oppose each other with at least one partition wall interposed therebetween in the filter.

11. The exhaust gas purification device according to claim 3, wherein the capacitance of the filter is detected by at least one pair of electrodes that forms a capacitor, the at least one pair of electrodes being disposed so as to oppose each other with at least one partition wall interposed therebetween in the filter.

12. The exhaust gas purification device according to claim 4, wherein the capacitance of the filter is detected by at least one pair of electrodes that forms a capacitor, the at least one pair of electrodes being disposed so as to oppose each other with at least one partition wall interposed therebetween in the filter.

13. The exhaust gas purification device according to claim 6 further comprising an orifice disposed in the bypass passage for regulating a flow rate of the exhaust gas flowing through the bypass passage.

14. The exhaust gas purification device according to claim 1, wherein the filter is a diesel particulate filter.

15. The exhaust gas purification device according to claim 14, wherein the engine is a diesel engine.

* * * * *